United States Patent
Krehbiel et al.

(10) Patent No.: US 8,788,067 B2
(45) Date of Patent: Jul. 22, 2014

(54) SYSTEMS AND METHODS FOR MODELING INTERDEPENDENCIES IN BATCH PROCESSES

(75) Inventors: Gretchen L. Krehbiel, Phoenix, AZ (US); Paul R. D'Mura, Glendale, AZ (US); Andrew J. Keizer, Peoria, AZ (US); Gigi Dewey, Phoenix, AZ (US); Robert C. Kline, Phoenix, AZ (US); William E. Godsil, Phoenix, AZ (US); Clark L. Case, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 773 days.

(21) Appl. No.: 12/827,982

(22) Filed: Jun. 30, 2010

(65) Prior Publication Data
US 2011/0301734 A1    Dec. 8, 2011

Related U.S. Application Data

(60) Provisional application No. 61/352,795, filed on Jun. 8, 2010.

(51) Int. Cl.
*G05B 15/02* (2006.01)
*G05B 19/418* (2006.01)

(52) U.S. Cl.
CPC .................. *G05B 19/418* (2013.01)
USPC ................................. 700/9; 700/99

(58) Field of Classification Search
USPC .......................................... 700/99
See application file for complete search history.

(56) References Cited

U.S. PATENT DOCUMENTS

| 5,740,431 A | * | 4/1998 | Rail ............................... 713/1 |
| 6,141,647 A | * | 10/2000 | Meijer et al. ................... 705/28 |
| 2009/0119130 A1 | * | 5/2009 | Kimmel et al. .................. 705/3 |

OTHER PUBLICATIONS

BatchControl.com, LLC; Artile entitled "S88.01 Tutorial"; http://www.batchcontrol.com/s88/01_tutorial/index.shtml; printed on May 6, 2010.

\* cited by examiner

*Primary Examiner* — Carlos Ortiz Rodriguez
(74) *Attorney, Agent, or Firm* — Fletcher Yoder P.C.

(57) ABSTRACT

According to various embodiments, an interdependency modeling method for controlling a batch process with an industrial automation system includes evaluating an input parameter expression residing in a level of a supervisory system of the industrial automation system to determine a value, transferring the value of the input parameter expression to a level of an equipment control system of the industrial automation system, transferring data from the level of the equipment control system to the level of the supervisory system, and evaluating an output parameter expression residing in the level of the supervisory system based on the data from the level of the equipment control system.

19 Claims, 5 Drawing Sheets

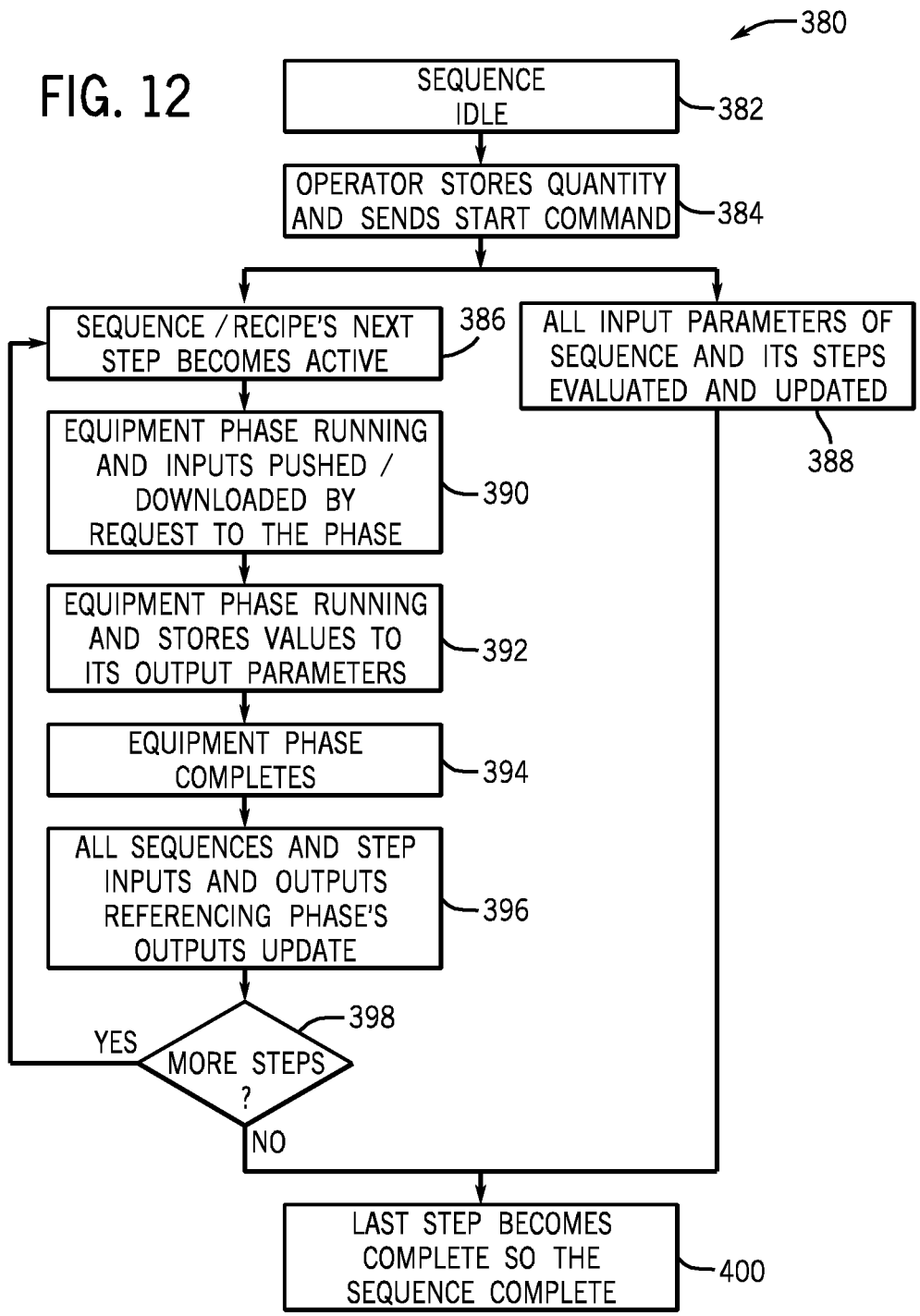

SYSTEMS AND METHODS FOR MODELING INTERDEPENDENCIES IN BATCH PROCESSES

CROSS REFERENCE TO RELATED APPLICATIONS

This application is a Non-Provisional Patent Application of U.S. Provisional Patent Application No. 61/352,795, entitled "Systems and Methods for Modeling Interdependencies in Batch Processes", filed Jun. 8, 2010, which is herein incorporated by reference.

BACKGROUND

The present invention relates generally to control systems and, more particularly, to modeling interdependencies in manufacturing processes capable of being described procedurally, such as batch production plants, where a set of inputs produces one or more outputs.

Batch operations produce finite quantities of material by processing input materials in a defined order using one or more pieces of equipment and/or manual process interactions. Examples of products made using batch manufacturing techniques include pharmaceuticals, foods and beverages, health and beauty products, and fine and specialty chemicals. The Instrument Society of America (ISA) S88 standard describes an internationally accepted way to describe how the manufacturing of finite quantities (batches or lots) of materials are produced. The activities and functions associated with batch production may be automated by modeling the procedures and the equipment used in manufacturing. Control systems configured to control the operation of batch operations may include both supervisory control and equipment control.

BRIEF DESCRIPTION

The present invention provides novel techniques for modeling interdependencies in manufacturing processes capable of being described procedurally, such as batch production plants, where a set of inputs produces one or more outputs. In particular, the present techniques are presented in the context of an industrial automation system that includes supervisory and equipment control systems. More particularly, in various embodiments, input parameter expressions and output parameter expressions are evaluated in the supervisory system to help improve performance of the equipment control system. However, it should be borne in mind that the invention may be applied in a wide range of contexts, in a variety of plants, and in any desired industrial, commercial, private, or other setting.

In accordance with one aspect of the present disclosure, an interdependency modeling method for controlling a batch process with an industrial automation system includes evaluating an input parameter expression residing in a level of a supervisory system of the industrial automation system to determine a value, transferring the value of the input parameter expression to a level of an equipment control system of the industrial automation system, transferring data from the level of the equipment control system to the level of the supervisory system, and evaluating an output parameter expression residing in the level of the supervisory system based on the data from the level of the equipment control system.

In accordance with another aspect, an automation system for a batch process includes a batch management system, which includes a hierarchical sequence of one or more steps. The sequence includes an input parameter expression and/or an output parameter expression. The automation system also includes an equipment control system, which includes a hierarchy of one or more levels. Finally, the automation system includes a data transfer link between the step of the batch management system and the level of the equipment control system.

In accordance with a further aspect, a computer readable storage medium includes computer code disposed on the computer readable storage medium. The code includes instructions for automating a batch process. The instructions include instructions for performing a hierarchical sequence of one or more steps. The sequence includes an input parameter expression and/or an output parameter expression. The code also includes instructions for performing a level of an equipment control system and instructions for transferring data between the step of the sequence and the level of the equipment control system.

DRAWINGS

These and other features, aspects, and advantages of the present invention will become better understood when the following detailed description is read with reference to the accompanying drawings in which like characters represent like parts throughout the drawings, wherein:

FIG. 12 is a block diagram of the steps of a sequence, in accordance with one aspect of the disclosure.

DETAILED DESCRIPTION

Various embodiments include methods for modeling interdependencies between process data as inputs to manufacturing processes capable of being described procedurally, such as batch manufacturing processes, and their evaluation during production so these values are more visible within a process, more easily managed, and more efficiently used. In addition, data relevant to the manufacturing process may be collected in one place, thereby reducing associated development and maintenance costs. Such embodiments may be implemented in a variety of industrial automation systems that include supervisory and equipment control systems. In various embodiments, input parameter expressions and output parameter expressions are evaluated in the supervisory system to help improve performance of the equipment control system.

Figure 1:
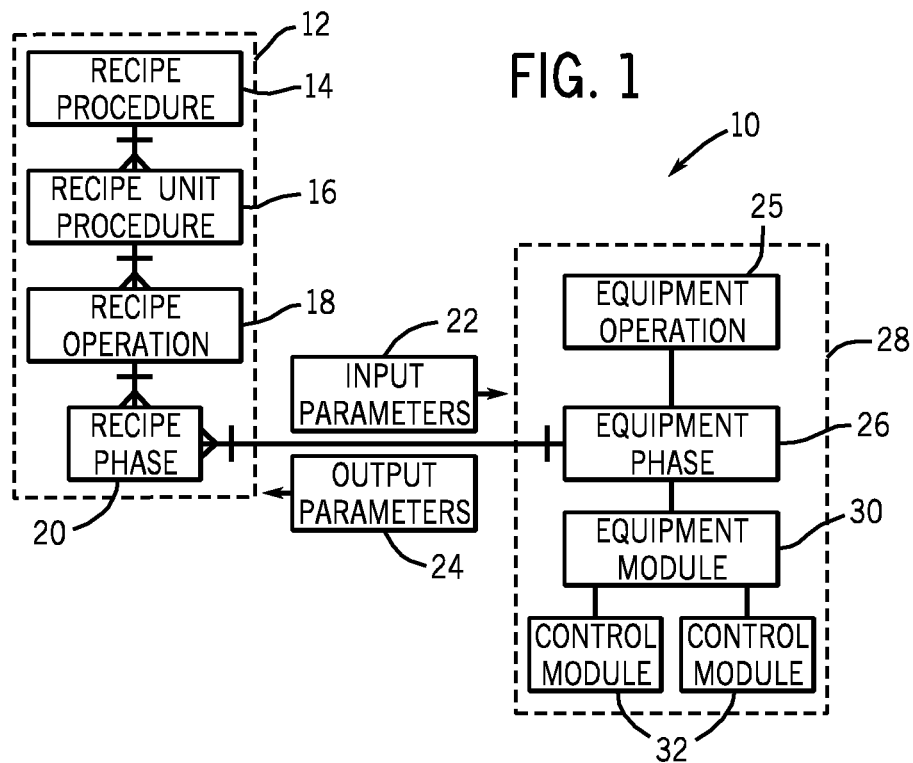
FIG. 1 is a block diagram of the linking of a control recipe procedure and equipment control system, in accordance with one aspect of the disclosure.

Turning to the figures, FIG. 1 shows the relationship of a control recipe procedure 12 using input and output parameter expressions and an equipment control system 28 according to an embodiment. The control recipe procedure 12 includes a hierarchy of levels and may be implemented using a supervisory system, a batch management system, or a batch engine. In addition, the control recipe procedure 12 may be implemented in a computer, such as a personal computer (PC). The highest level of the hierarchy is a recipe procedure 14, which defines an overall strategy for making a batch and consists of an ordered set of unit procedures. The next level in the hierarchy is a recipe unit procedure 16, which is an ordered set of operations that is carried to completion on a single unit. A unit represents a fundamental equipment entity that manufactures batches or parts of batches. In other words, the recipe unit procedure 16 is a production sequence that acts on one unit. In embodiments described in detail below, input and output parameter expressions may be evaluated on every step of every level of the production sequence. Furthermore, only one recipe unit procedure 16 may be allowed to be active on a unit at any time. The next level of the control recipe procedure 12 is a recipe operation 18, which is an ordered set of phases carried to completion within a single unit. For example, a recipe operation 18 may involve taking material through some type of physical, chemical, or biological change. Typically, only one recipe operation 18 may be active on a particular unit at a time. The lowest level of the control recipe procedure 12 is a recipe phase 20, which is the smallest element of procedural control that may accomplish process oriented tasks. A recipe phase 20 typically performs unique and independent functions, such as adding an ingredient or mixing ingredients. Thus, the other levels of the control recipe procedure 12, namely the recipe procedure 14, the recipe unit procedure 16, and the recipe operation 18, group, organize, and direct the recipe phase or phases 20.

On the right hand side of FIG. 1 is shown the equipment control system 28. As with the control recipe procedure 12, the equipment control system 28 consists of a hierarchy of levels. In addition, the equipment control system 28 may be implemented in a programmable logic controller (PLC) or distributed control system (DCS). The highest level of the equipment control system 28 shown in FIG. 1 is an equipment operation 25. The equipment operation 25 is similar to the recipe operation 18 and represents an ordered set of equipment phases carried to completion within a single unit. In other embodiments, the equipment control system 28 may have levels higher than the equipment operation 25, such as an equipment unit procedure and/or equipment procedure. The equipment phase 26 is similar to the recipe phase 20 and represents a sequence of steps and transitions used to perform process oriented tasks. The equipment phase 26 is connected, or linked, to the recipe phase 20, such that information sharing between them is facilitated. In other embodiments, the link between the control recipe procedure 12 and the equipment control system 28 may occur at other levels. For example, the link may occur between the recipe operation 18 and the equipment operation 25. The next level of the hierarchy of the equipment control system 28 is an equipment module 30, which is a functional group of equipment that may carry out a finite number of specific minor processing activities. In other words, the equipment module 30 may group physical devices for performing one or more specific functions. The equipment module 30 for an embodiment may include control modules or other equipment modules. The lowest level of the hierarchy of the equipment control system 28 is a control module 32, which is the most basic element of the physical model, or equipment control system 28. Typically, the control module 32 may be a collection of sensors, actuators, or other control modules and associated process equipment. This collection, from the point of view of control, is operated as a single entity. Examples of control modules 32 may include, but are not limited to, valves and pumps.

As shown in FIG. 1, information is shared between the recipe phase 20 and the equipment phase 26. As mentioned above, in other embodiments, information may be shared between different levels, such as between the recipe operation 18 and the equipment operation 25. In the embodiment shown in FIG. 1, input parameters 22 are sent from the recipe phase 20 to the equipment phase 26. In other words, a reference is made to an equipment phase 26 at the phase level in the control recipe procedure 12 that is executed in a control system that performs a particular function. This reference may be handled by sending the input parameters 22 from the recipe phase 20 to the equipment phase 26. As the equipment phase 26 executes, or when the equipment phase 26 is finished executing, it may then send results, in the form of output parameters 24, back to the recipe phase 20. In other words, output parameters 24 may be used to push data across the machine boundary between the PLC of the equipment control system 28 and the PC of the control recipe procedure 12. The output parameters 24 may then be inserted into a database or included in a batch report.

Before discussing a walkthrough of the steps of an exemplary system, parameter expressions will be explained. A parameter expression is an arithmetic expression that may be assigned to an input parameter or output parameter of a recipe or a step at all levels of the procedural control hierarchy (phase, operation, unit procedure, batch procedure) where it is appropriate. The parameter expressions may be as complex as necessary to represent the relationships between data of the manufacturing process. In addition, parameter expressions provide a means to move the ability to perform calculations into the structure of the recipe. Thus, utilization of such parameter expressions enables the control assets to perform needed mathematic operations instead of complex and awkward downloading and uploading of parameter data. One possible application of parameter expressions includes aggregation of output parameter data into KPIs (key process indicators) at the appropriate level of the recipe. Another possible application includes enabling flexibility in calculating input parameters. Further, utilization of parameter expressions may enable greater accuracy. For example, a parameter expression may reference an actual quantity of material added to a batch instead of a less accurate target quantity.

The terms of the parameter expression may reference several different sources of data, which are discussed below. In addition, input and output parameters behave differently because their expected roles are different: an input supplies data to the process and an output reports a result of the process. The two kinds of parameters (input or output) are evaluated and the results are stored as the value of the parameters at different times. Parameter expressions may include typical mathematic functions in addition to, for example, absolute value, truncate, round, round up, and/or modulo. Furthermore, parameter expressions may include referencing output parameters on parent operations, unit procedures, and/or batch procedures and peer steps within the recipe. Finally, parameter expressions may reference data in the parent recipe's header.

Next, the following discussion focuses on input parameter and output parameter expressions. Discussion will initially focus on input parameter expressions and discussion of output parameter expressions follows. In certain embodiments of procedural control, the input parameter expressions to a process are dependent on other variables, such as the results of other procedures (output parameters), input parameters to other procedures, attributes, or statuses of equipment, and/or the value of characteristics of materials. These dependencies are traditionally dealt with in the control layer, or equipment control system, of the automation system by programming within a controller. In accordance with present embodiments, an input parameter expression is defined to derive its value from the evaluation of an arithmetic expression referencing any or all of these types of data. That is, an input parameter expression is defined such that it derives its value from an arithmetic expression that references other variables on which the input parameter expression depends. The result is a control solution that is less complex, easier to develop, easier to maintain, and/or less expensive overall. In addition, an input parameter expression may include a self-scaling set point.

Specifically, in various embodiments, input parameter expressions are defined as mathematic expressions and are calculated at runtime. Such input parameter expressions are not coded in the control logic. An input parameter expression includes one or more terms with arithmetic operations connecting them. A term may be a constant value, a data reference, or another expression. For input parameter expressions, the data references are subscribed, such that as the data sources change their values, the expression is notified and it evaluates, storing the new value for the input parameter expression. Conceptually, input parameter expressions are intended to get data from sources above them or at the same level within the recipe hierarchy. Input parameter expressions may include terms referencing data included in the recipe. Examples of terms include, but are not limited to, parameters of peer steps, parameters and recipe header data of the recipe parent, attributes of the bound unit, or the scaling factor (a runtime attribute). Input parameter expressions are configured based on the parameters of recipe steps. The use of expression terms referencing unit attributes will automatically create additional binding requirements. Units that support all attributes referenced in parameter expression terms may be considered binding candidates.

Furthermore, input parameter expressions are constantly evaluated. Subscriptions are created to each data reference. As these values update, the input parameter expression evaluates and updates the value of its parameter. Every change in the value of an input expression is not recorded in an event journal to avoid overwhelming the event journal with frivolous events. It is possible for an input parameter expression to evaluate to a value outside the range limits of the input parameter. When this happens, the value assigned to the input parameter may be a tag, such as BAD_VALUE. There may be several ramifications of an input parameter having a BAD_VALUE, such as, but not limited to a download request to a controller causes the requesting equipment phase to automatically become held, a transition expression that references the BAD_VALUE parameter itself evaluates to BAD_VALUE which prevents the transition from firing, a binding expression that references the BAD_VALUE parameter becomes unable to find binding candidates (such that binding will be pending and the execution of the recipe will not advance) or an input parameter expression that references a parameter with a BAD_VALUE evaluates its expression to BAD_VALUE. When an input parameter expression evaluates, the result is compared to a verification policy (e.g., Hi/Low, Hi-Hi/Low-Low, or Hi-Hi-Hi/Low-Low-Low). If the value falls outside the expected range, the appropriate verification policy action is triggered. A value of BAD_VALUE alone does not trigger a verification policy. In addition, operators may override the input parameter expression and assign a value when responding to extraordinary circumstances.

A manufacturing system or automation system that includes input parameter expressions may be implemented in a variety of ways, such as, but not limited to those listed herein. For example, certain embodiments of manufacturing systems may include one or more definitions for procedural sequences having input parameter expressions to specify particular values for how a manual or automated sequence of manufacturing tasks are to be performed. In other embodiments, the definition of procedural sequences may be a single procedure or a hierarchical organization of procedural sequences. Some embodiments include equipment definitions that refer to the characteristics, attributes, and/or statuses that the equipment has during operation. Some embodiments include definitions of materials or components used in the manufacturing process that refer to characteristics, attributes, and/or statuses of the materials or components. Some embodiments include one or more procedural sequence engines that drive and coordinate the execution of procedural sequences. If equipment is present, certain embodiments include a system for storing and delivering the value of the characteristics, attributes, and/or statuses of that equipment during production. If materials and/or components are present, other embodiments may include a system for storing and delivering the value of the characteristics, attributes, and/or statuses of the materials or components during production.

Thus, in various embodiments of procedural control systems having a hierarchy of coordinating and control sequences, input parameter expressions may reference other sources of data, parameters of other sequences, equipment attributes, and/or material attributes and so simplify and improve the handling of this data by moving it up into a supervisory sequence instead of being manipulated by the controller, or equipment control system. In other words, by using input parameter expressions, input parameters need not reference a scaling factor, which is a value assigned to the procedural sequence when it is first run. In addition, any arithmetic operations on data need not be coded into and performed as part of the control code in the controller. Making input parameters to procedural sequences "smart" enables the control engineer to encode into a supervisory sequence the data interdependencies and calculations of the process being followed. Thus, control logic need not scale values or calculate input values. Instead, the control logic can focus on control and a supervisory layer manages the control inputs.

The following discussion focuses on output parameter expressions, which are parameters holding a value resulting from the execution of a sequence or procedure. An output parameter expression on a recipe is expected to hold process data collected from the execution of the recipe's sequence of steps. Output parameter expressions on higher-level recipes provide a simple way for process variables representing the execution of the whole recipe to be aggregated. The recipe itself is capable of pulling data together in real time for analysis and reporting, simplifying reporting overall. Output parameter expressions may be configured for any layer of a recipe.

Various embodiments of automation systems include methods for aggregating data resulting from the execution of procedural control sequences so the data is more easily and efficiently available for use within the manufacturing process itself, as well as for real time analysis and historical reporting. In particular embodiments of procedural control, the result of a procedure is stored as the value of an output parameter expression. Each process step may have several output parameter expressions. Each of these is uploaded to a supervisory system to record process changes, operation of the procedure, use of equipment, materials consumed, and/or materials produced. In contrast, these dependencies are traditionally dealt with in the control layer of the automation system by programming within a controller. In various embodiments, the aggregation of data can also record the value of attributes of equipment and of materials used, providing a context for what are typically sampled data points within the record of the manufacturing procedure.

Specifically, in accordance with various embodiments, output parameter expressions, are defined as mathematic expressions and are calculated at runtime. Such output parameter expressions are not coded in the control logic. An output parameter expression includes one or more terms with arithmetic operations connecting them. A term may be a constant value, a data reference, or another expression. For output parameter expressions, evaluation of the expression does not update as references change, but only as the expression is triggered. Conceptually, output parameter expressions are intended to record data resulting from the execution of the process the step represents. This data typically comes from below the level of the recipe within the hierarchy (child data) or references the current level (peer data or data on the same step) and may include recipe header data, equipment data, and/or runtime data. Output parameter expressions may be configured on operation, unit procedure, and batch procedure recipes. Output parameter expressions are configured on output parameters on the recipes (not the steps).

Regarding evaluation of output parameter expressions at runtime, they differ from input parameter expressions regarding when they are evaluated. Input parameter expressions update continuously. In contrast, output parameter expressions are configured to update on triggers. Thus, the output values may be stored in a batch server only when the phase logic is ready to do so. For example, the phase step may transition to a terminal state and the values may be automatically uploaded. Further, an upload may be requested by the phase logic, such that the upload is made on demand. Thus, output parameter expressions update when their step transitions to a terminal state, such as complete, stopped, or aborted.

Output parameters may typically not be changed by the operator under normal circumstances because this may be considered corrupting the record of the execution of a procedure. However, there may be cases where an operator may want to override the value of an output parameter expression. For example, a transition expression may reference the output parameter expression and its value is preventing the transition from firing. In this case, the transition may be forced to fire. Further, an input parameter expression may be dependent on an output parameter to provide its value. If the output parameter expression is for some reason incorrect or undesirable, there may be cause to override it. In this case, the value of the input parameter expression may be overridden instead of overriding the value of the output parameter expression.

A manufacturing system or automation system that includes output parameter expressions may be implemented in a variety of ways, such as, but not limited to those listed herein. For example, certain embodiments of manufacturing systems include one or more definitions for procedural sequences having output parameter expressions to record specific process, equipment, and material values for manual or automated sequence manufacturing tasks that were performed. Some embodiments include equipment definitions that refer to the characteristics, attributes, and/or statuses that the equipment has during operation. Further embodiments include definitions of materials or components used in the manufacturing process that refer to characteristics, attributes, and/or statuses. Some embodiments include one or more procedural sequence engines that drive and coordinate the execution of procedural sequences. If equipment is present, certain embodiments may include a system for storing and delivering the value of the characteristics, attributes, and/or statuses of that equipment during production. If materials and/or components are present, embodiments may include a system for storing and delivering the value of the characteristics, attributes, and/or statuses of the materials or components during production.

Thus, in various embodiments of procedural control systems having a hierarchy of coordinating and control sequences, output parameter expressions may reference other sources of data, parameters of other sequences, equipment attributes, and/or material attributes. As the referenced data changes, the value of the output parameter expressions may be calculated and recorded as part of the record of the executing manufacturing procedure. This simplifies and improves the handling of generated data by moving the responsibility to collect and analyze the data into a supervisory sequence instead of being manipulated by the controller. The aggregated data may be available in near real-time so that data is available to the executing process itself. The executing procedural sequence provides a context for the generated data so it can be associated with the production of a product, even for the status of equipment and the characteristics of material ingredients. In other words, by using output parameter expressions as described in detail below, the supervisory system may be able to access more than just the data directly from the controller. Thus, the controller need not perform certain types of aggregation or manipulation of data. Moreover, in postproduction analysis, correlating sampled data values from equipment and materials to process events is a difficult problem typically solved by using timestamps. In contrast, by adding output parameter expressions to parts of the procedural sequence and collecting that data at those times, data is given context without the need for timestamps.

Regarding both input and output parameter expressions, the various manufacturing systems listed above may be hosted in a controller, a computer outside the controller, and/or a network of controllers, computers or a combination of controllers and computers. An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing embodiments of the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via wireless transmission, wherein when the computer program code is loaded into and executed by a computer, the computer becomes an apparatus for practicing embodiments of the invention. When implemented on a general-purpose processor, the computer program code segments configure the processor to create specific logic circuits. A technical effect of such systems may include, among others, the modeling of interdependencies in batch production plants.

Further, in such systems the value of an input or output parameter expression to a procedural sequence may be an arithmetic expression including terms that are references to a variety of data, such as process data. For example, any of the arithmetic terms may be a reference to a variable of a parent procedural sequence. In addition, any of the arithmetic terms may be a reference to a variable of a peer procedure within a parent procedural sequence. Further, any of the arithmetic terms may be a reference to a variable of a child procedure within the procedural sequence. Any of the arithmetic terms may be a reference to a variable of the equipment the procedural sequence is controlling, running on, or associated with. Moreover, any of the arithmetic terms may be a reference to a variable of the material or component the manufacturing process is consuming, producing, and/or assembling. In addition, a change in value of a term of the arithmetic expression of the parameter may result in the expression being evaluated and its value being stored. Particular embodiments may include designations of "not a value," "bad value," and/or "bad quality of data," for example, when data has not been specified for the parameter yet. Further, string, logical, and/or binary operators may be used in expressions.

Figure 2:
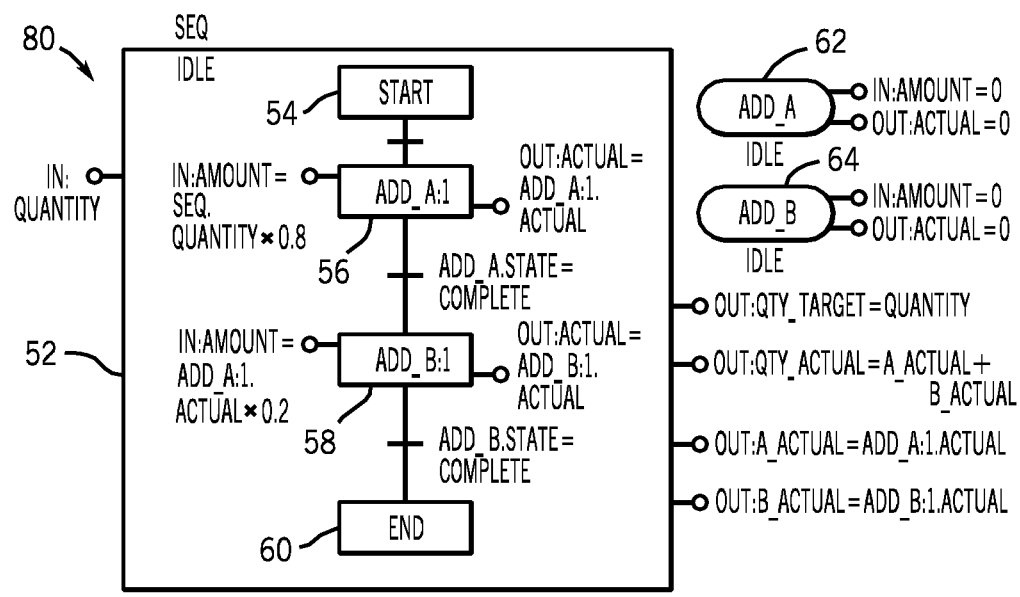
FIG. 2 is a block diagram of an idle sequence, in accordance with one aspect of the disclosure.

Returning to the figures, FIG. 2 shows the relationship between a sequence 52, or recipe operation 18, and accompanying equipment phases according to an embodiment implementing both input and output parameter expressions. The overall configuration of the sequence and equipment phases may be referred to by reference numeral 80. On the left hand side of FIG. 2 is the sequence 52, labeled SEQ. Shown inside the sequence 52 are the various steps, or recipe phases 20, of the sequence 52. The sequence 52 represented in FIG. 2 is a simple sequence involving the addition of two ingredients A and B. Thus, the first step of sequence 52 is a start step 54 followed by the addition of ingredient A in step 56, ADD_A:1, followed by the addition of ingredient B in step 58, ADD_B:1, and finally, followed by an end step 60. On the left hand side of the sequence 52 is an input parameter that represents the desired total quantity of the batch. In addition, step 56 includes an input parameter expression and an output parameter. The input parameter expression returns a value equal to the amount of ingredient A to be added. As shown in FIG. 2, the value of the input parameter expression is determined by multiplying the total quantity of the batch, SEQ.QUANTITY, by 0.8. In other words, ingredient A is intended to be approximately eighty percent of the total batch. Similarly, step 58 also has an input parameter expression that represents the amount of ingredient B to be added to the batch. As shown in FIG. 2, the amount of ingredient B is determined by multiplying the actual amount of ingredient A added, ADD_A:1.ACTUAL, by 0.2. In other words, ingredient B is intended to be approximately twenty percent of the total batch.

Moving to the right hand side of the sequence 52, step 56 has an output parameter which represents the actual amount of ingredient A added to the batch, ADD_A.ACTUAL. Similarly, step 58 also has an output parameter which represents the actual amount of ingredient B added to the batch, ADD_B.ACTUAL. In between step 56 and step 58 is a horizontal line that represents a transition, which is the condition for transferring control from an active step preceding the transition to the step following the transition. In other words, when a transition is true, or fires, the active step immediately before the transition becomes inactive and the step immediately after the transition becomes active. Thus, for a transition to activate the step following it, the step preceding the transition is active when the transition fires. The transition shown in between steps 56 and 58 represents the condition that the addition of ingredient A is complete. Thus, when the addition of ingredient A is complete and the transition fires, the next step 58 becomes active. Similarly, a transition is shown following step 58, which represents that the addition of ingredient B is complete. When the addition of ingredient B is complete, the transition fires and the end step 60 becomes active.

Besides the input parameter representing the total quantity of the batch, there may be several output parameters and output parameter expressions associated with the sequence 52. These are shown to the right of the sequence 52. For example, the outputs from the sequence 52 may include the target quantity, the actual total quantity, the actual quantity of ingredient A, and the actual quantity of ingredient B. The actual total quantity may be determined by adding together the actual quantity of ingredient A and the actual quantity of ingredient B in an output parameter expression, as shown in FIG. 2. Finally, to the right of the sequence 52, are two equipment phases. The first equipment phase 62, ADD_A, represents adding ingredient A to the batch. The second equipment phase 64, ADD_B, represents adding ingredient B to the batch. Each of the equipment phases 62 and 64 has input and output parameters associated with it. The input parameters represent a target quantity and the output parameters represent an actual quantity. As shown in FIG. 2, the sequence 52 and the equipment phases 62 and 64 are all in the idle state at the beginning of a batch. Thus, the input and output parameters to the equipment phases 62 and 64 are all set an initial value of zero.

Next, some considerations regarding input and output parameter expressions are provided before describing how input and output parameter expressions may be used in the sequence 52 of FIG. 2. It should be kept in mind that the ability to define an input or output parameter's value as an expression in reference to other data in the sequence, attributes of equipment, and/or characteristics of materials increases the descriptive power of the sequence. Interdependencies that were encoded into phase logic may now be stored as part of the overall description improving the modularity and reusability of the control code. In addition, the use of parameter expressions leads to several desirable requirements. First, output parameters are not subscribed to. When data sources for an expression are subscribed, if the values of the data sources change, the expression is notified, evaluates using the changed values of the data sources, and stores a new value for the parameter. Instead, equipment phases may notify the sequence when the output parameter value is ready to be used. Similarly, sequence and step expressions that reference output parameters will not receive an output parameter value until the step enters a terminal state. Second, the operator may be able to see the value of an input parameter so that if a correction is needed, the operator has an opportunity to make a change. As data becomes available, the user may be able to see the current value of terms of the expression or the whole evaluated expression. In addition, the use of input and output parameter expressions may provide a number of advantages over traditional methods. For example, the modeling regarding how to make a product may be included within the definition of the sequence or recipe. Thus, the creation of additional sub-routines of code to retrieve necessary data, perform required mathematics, and store the results may not be necessary by using input and output parameter expressions. Thus, sequence definition and control may be wholly included within the sequence definition. An additional advantage of using input and output parameter expressions is that the configuration of the PLC and its programming may be less complicated and fewer processing resources of the controller may be required.

Figure 3:
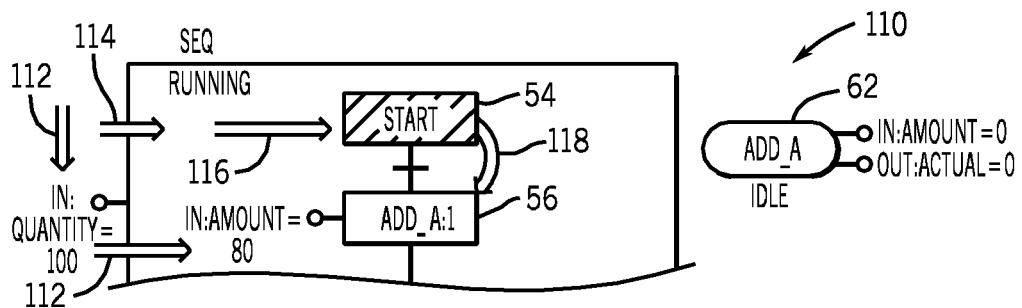
FIG. 3 is a block diagram of the start of a sequence, in accordance with one aspect of the disclosure.
Figure 4:
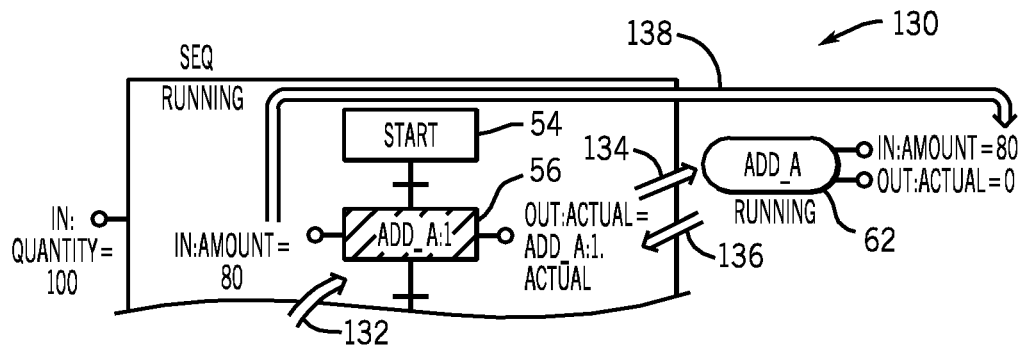
FIG. 4 is a block diagram of a running sequence and a first running equipment phase, in accordance with one aspect of the disclosure.

FIG. 3 shows a portion of the sequence 52 representing a start 110 of the equipment sequence. In a first step 112, the operator stores the total quantity of the batch to be made, which in this case is 100. The total quantity may be in units of mass, such as kilograms, units of volume, such as liters, or any other appropriate units of measure. In addition, as soon as the value of the total quantity changes, any input parameter expressions using the value are evaluated and a new value is stored for the input parameter expression. As shown in FIG. 4, the ADD_A:1 AMOUNT step input parameter expression includes a reference to the total quantity for the sequence 52 of 100. As soon as the value of the total quantity changes, the evaluated input value of 80, obtained by multiplying 100 by 0.8, is copied into the ADD_A:1 AMOUNT input parameter. In a second step 114, the operator sends a start command to the sequence 52. Subsequently, in a third step 116, the equipment sequence initiates execution of the sequence's chart. The start step 54 and the transition following it are activated, as indicated by the cross-hatching of step 54. The state of the sequence 52 is updated to reflect the status of its active components, namely running as opposed to idle as was shown in FIG. 2. Finally, in a fourth step 118, the transition shown between steps 54 and 56 immediately evaluates true and step 56, ADD_A:1, is sent a start command.

FIG. 4 shows how the ADD_A phase 62 requests input parameter values, as represented by reference numeral 130. In a first step 132, the sequence 52 makes the ADD_A:1 step 56 active, as indicated by the cross-hatching of step 56. In a second step 134, the ADD_A:1 step 56 connects to the ADD_A equipment phase 62. Once connected, the sequence and/or step commands the phase to begin. In a third step 136, the equipment phase 62 executes its starting logic. Completing the starting logic causes the equipment phase 62 to move from the idle state to the running state and the equipment phase 62 automatically begins executing its running logic. When the equipment associated with equipment phase 62 is ready, the equipment phase 62 requests a value for its input parameter, AMOUNT. Finally, in a fourth step 138, the sequence 52 moves the value of 80 from the ADD_A:1 AMOUNT step input parameter to the AMOUNT input parameter of the ADD_A equipment phase 62.

Figure 5:
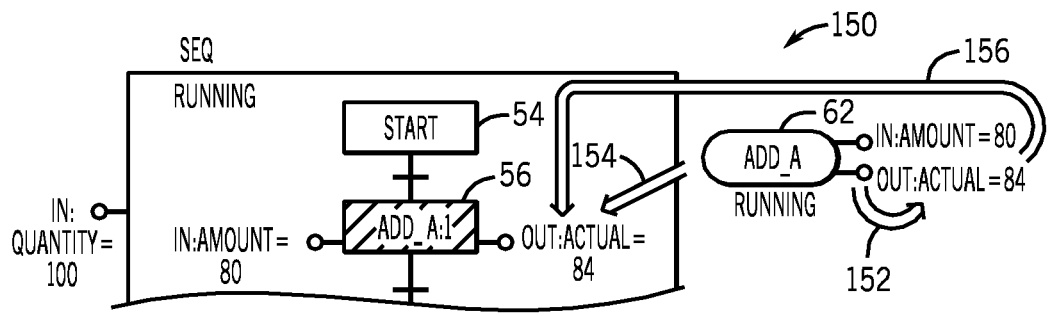
FIG. 5 is a block diagram of a running sequence and a first running equipment phase requesting an output parameter, in accordance with one aspect of the disclosure.

FIG. 5 shows how the ADD_A phase requests an output parameter value to be copied to the step, as represented by reference numeral 150. A first step 152 involves the ADD_A equipment phase 62 storing the value of 84 into its output parameter, ACTUAL. This represents the actual amount of ingredient A added as the phase ran. Minor discrepancies between the target and the actual amount may occur in batch processes as a result of factors, such as, but not limited to, equipment capability, equipment calibration, and/or measurement error. In a second step 154, the equipment phase 62 requests that its ACTUAL output parameter be read by the sequence from a later logic instruction. Thus, the output parameter for step 56 representing the actual amount of ingredient A added equals 84. In a third step 156, the sequence step 56 moves the value of 84 from the equipment phase output ACTUAL into the ADD_A:1 ACTUAL output parameter. In addition, as soon as the value of the ADD_A:1 ACTUAL output parameter changes, any input parameter expressions using the value are evaluated and a new value is stored for the input parameter expression. As shown in FIG. 2, the ADD_B:1 AMOUNT step input parameter expression includes a reference to the ADD_A:1 ACTUAL output parameter. As soon as the value of the ADD_A:1 ACTUAL output parameter changes, the evaluated input value of 16.8, obtained by multiplying 84 by 0.2, is copied into the ADD_B:1 AMOUNT input parameter.

Figure 6:
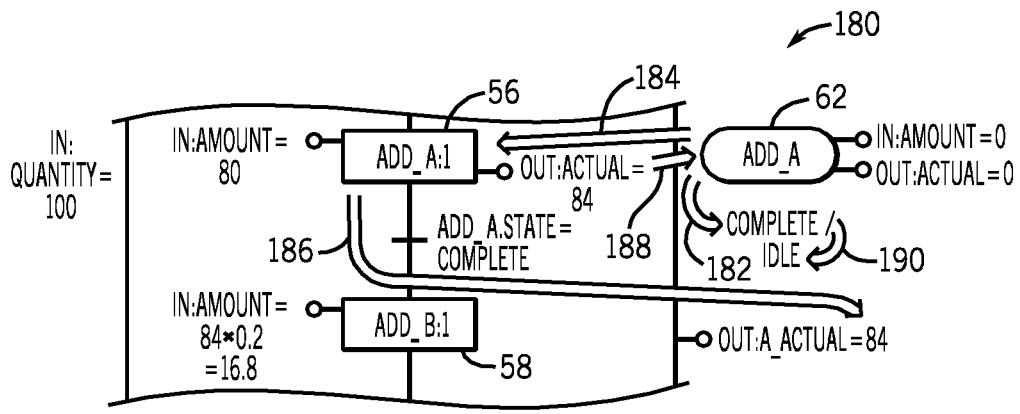
FIG. 6 is a block diagram of a running sequence and a first complete equipment phase, in accordance with one aspect of the disclosure.

FIG. 6 shows how the ADD_A phase completes, and then commands the ADD_B:1 step to start, as represented by reference numeral 180. In a first step 182, the ADD_A equipment phase 62 finishes and changes its state from running to complete. In a second step 184, the sequence step 56 is notified of the state change by subscription from the equipment phase 62. In a third step 186, the ADD_A:1 step 56 becomes complete and its transition to a terminal state is a signal to update parameter expression subscriptions on its output parameter ACTUAL. In other words, the actual amount of ingredient A is sent to the output parameter of the sequence 52 when the ADD_A:1 step 56 transitions to a terminal state, representing the actual amount of 84. In a fourth step 188, the transition expression following the ADD_A:1 step 56 evaluates true and begins its firing procedure. Finally, in a fifth step 190, the equipment phase 62 changes state from complete to idle. The input and output phase parameters are reset to zero by the custom phase logic. As discussed above with respect to FIG. 5, the ADD_B:1 AMOUNT step input parameter expression, 84×0.2, evaluates as soon as the value of the ADD_A:1 ACTUAL output parameter changes, saving the value of 16.8 for the input parameter.

Figure 7:
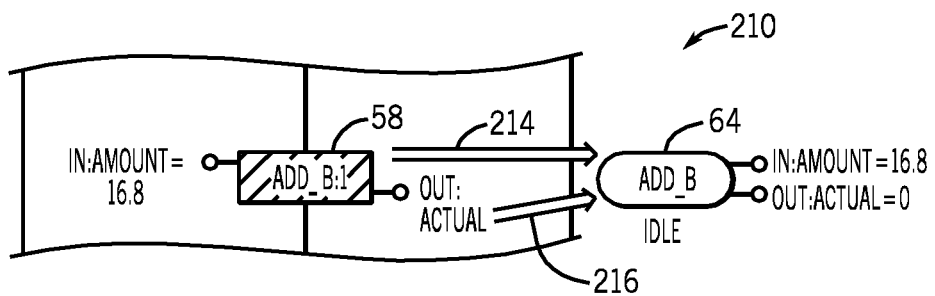
FIG. 7 is a block diagram of a running sequence and a second idle equipment phase, in accordance with one aspect of the disclosure.

FIG. 7 represents the ADD_B:1 step running its associated equipment phase, as represented by reference numeral 210. In a first step 214, the ADD_B:1 step 58 connects to the ADD_B equipment phase 64. In a second step 216, the equipment phase 64 is configured to have its input parameter automatically downloaded. When the connection between step 58 and phase 64 is successful, the value of 16.8 from step input parameter ADD_B:1 AMOUNT is downloaded to the ADD_B equipment phase's AMOUNT input parameter. Thus, the input parameter for equipment phase 64 is shown with a value of 16.8.

Figure 8:
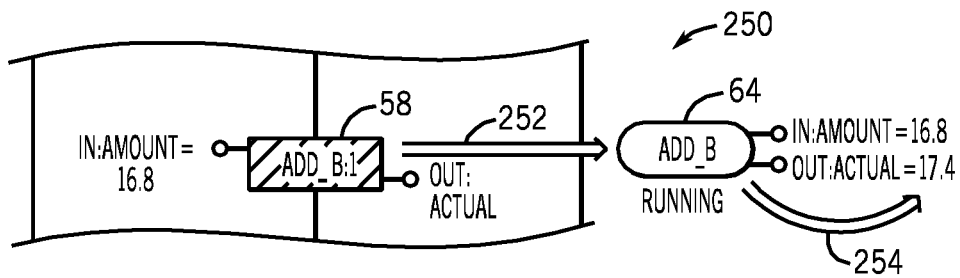
FIG. 8 is a block diagram of a running sequence and a second running equipment phase, in accordance with one aspect of the disclosure.

FIG. 8 shows the ADD_B phase running, as represented by reference numeral 250. In a first step 252, step 58 commands equipment phase 64 to start. The equipment phase 64 executes its starting logic. When the starting logic of the equipment phase 64 runs to completion, the phase state machine automatically executes its running logic. The phase is not programmed to request its input parameters because it was configured to have them automatically downloaded when it became active. In a second step 254, the equipment phase 64 executes its running logic. As the equipment phase 64 runs, it saves the actual amount used (17.4) into the ACTUAL output parameter. Again, minor discrepancies between the target input amount and the actual amount may be expected.

Figure 9:
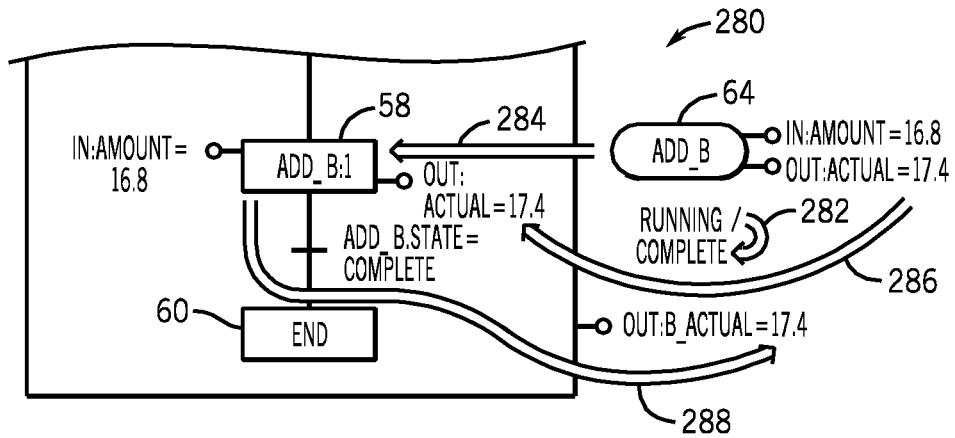
FIG. 9 is a block diagram of a running sequence and a second running equipment phase requesting an output parameter, in accordance with one aspect of the disclosure.

FIG. 9 shows how the ADD_B phase completes and the sequence reads its phase outputs and updates references, as represented by reference numeral 280. In a first step 282, the ADD_B equipment phase 64 changes state from running to complete. In a second step 284, the equipment sequence 52 receives notification that the equipment phase 64 is complete. In a third step 286, the phase 64 is configured to have its output parameter data automatically uploaded when the phase 64 becomes complete. Thus, the sequence step 58 moves the value 17.4 from the ADD_B ACTUAL phase output into the ADD_B:1 ACTUAL step output parameter. Finally, in a fourth step 288, the ADD_B:1 step becomes complete and becoming a terminal state is a signal to update parameter expression subscriptions on its output parameter ACTUAL. In other words, the actual amount of ingredient B is sent to the output parameter of the sequence 52, representing the actual amount of 17.4.

Figure 10:
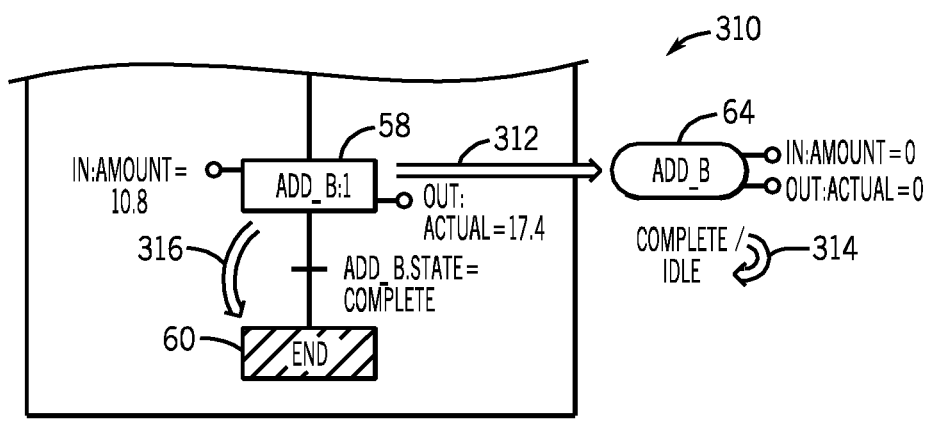
FIG. 10 is a block diagram of a running sequence and a second complete equipment phase, in accordance with one aspect of the disclosure.

FIG. 10 shows how the ADD_B phase completes and commands the next step to start, as represented by reference numeral 310. In a first step 312, the sequence step 58 changes its state to complete. The transition expression following step 58 evaluates true and begins its firing procedure. A reset command is sent to the ADD_B equipment phase 64. In a second step 314, the equipment phase 64 changes state from complete to idle. The input and output phase parameters are reset to zero by the custom phase logic. In a third step 316, the transition sends a start command to the end step 60, as indicated by cross-hatching of step 60.

Figure 11:
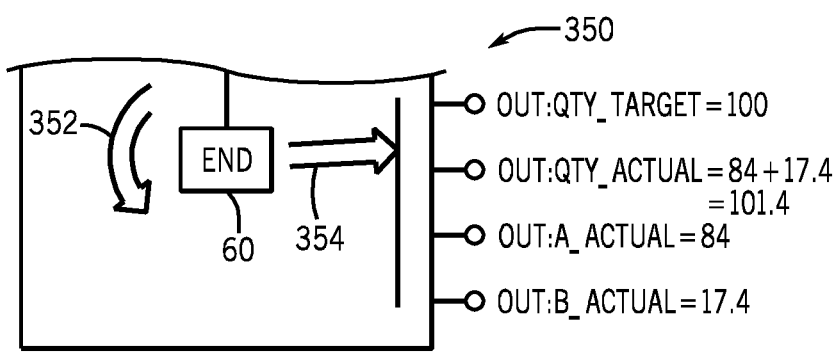
FIG. 11 is a block diagram of a completed sequence, in accordance with one aspect of the disclosure.

FIG. 11 shows completion 350 of the sequence 52. In a first step 352, the end step 60 of the sequence 52 has no code to run. The end step 60 may perform some clean up work internally for the sequence 52 and becomes complete. In a second step 354, the output parameters and expressions for the sequence 52 are evaluated and saved. Specifically, the output parameter expression for the total actual quantity, QTY_ACTUAL, is evaluated by adding together the actual quantity of A (84) and the actual quantity of B (17.4) to give a total of 101.4. The output parameters of the target quantity (100), the actual quantity of A (84), and the actual quantity of B (17.4) are saved. Finally, the sequence 52 changes state from running to complete.

FIG. 12 represents steps 380 that may be performed as a sequence that resides in a supervisory system of an industrial automation system moves from idle to complete using input parameters and output parameter expressions according to various embodiments. Although shown as an operation recipe running equipment phases, in other embodiments, the sequence may represent a unit procedure running equipment operations. In other words, the term "equipment phase" may be replaced with "equipment operation" throughout FIG. 12. In further embodiments, the sequence may represent a procedure running unit procedures. Thus, the term "equipment phase" may be replaced with "unit procedure" throughout FIG. 12. First, the sequence begins in a default state of idle, as represented by step 382. In step 384, the sequence may receive data from the operator, such as a total quantity for a batch, and may receive an initiation command, such as when the operator sends a start command to the sequence. The sequence may then transition from the idle state to the running state in steps 386 and 388. While the sequence is running, various input parameter expressions may be evaluated and updated by the sequence in step 388. The values of the input parameter expressions may be used to specify how tasks associated with the batch are to be performed, as described above. For example, after an equipment phase to the sequence is initiated, the results of the input parameter expressions may be used by the equipment phase as it moves from idle to running in step 390. The equipment phase may reside in a control system of the industrial automation system separate from the supervisory system. In step 392, the equipment phase continues to run and records its process values in its output parameters. In step 394, the equipment phase completes its tasks and the values in its output parameters are presumed to be ready for use. In step 396, the output parameters are updated. Any output parameter expressions may be evaluated and updated by the sequence in step 396. As described above, the value of the output parameter expression may be used to record process, equipment, or material values for tasks performed by the automation system. At step 398, if additional sequence steps exist, they may be performed and additional equipment phases completed, depending on the particular sequence selected by the operator. Once all the steps of the sequence are complete, the sequence moves to the complete state in step 400.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An interdependency modeling method for controlling a batch process with an industrial automation system, comprising:
    evaluating during runtime an input parameter expression residing in a level of a supervisory system of the industrial automation system to determine a value of the input parameter expression, wherein the input parameter expression is based at least in part on a subscription to a data reference residing at or above the level of the supervisory system where the input parameter expression resides, and wherein the input parameter expression updates continuously;
    transferring the value of the input parameter expression to a level of an equipment control system of the industrial automation system;
    transferring data from the level of the equipment control system to the level of the supervisory system;
    evaluating an output parameter expression residing in the level of the supervisory system based on the data from the level of the equipment control system, wherein the output parameter expression updates based on a trigger; and
    presenting a value of the output parameter.

2. The method of claim 1, wherein the input parameter expression and output parameter expression each comprise an arithmetic expression that includes terms that are references to process data associated with the batch process, references to variables associated with materials used by the batch process, references to variables of the supervisory system, references to variables of the equipment control system, or combinations thereof.

3. The method of claim 2, wherein the variables of the equipment control system refer to characteristics, attributes, or statuses of equipment used in the batch process during operation of the equipment.

4. The method of claim 2, wherein the variables associated with materials used by the batch process refer to characteristics, attributes, or statuses of material used in the batch process.

5. The method of claim 2, comprising updating an input parameter expression or output parameter expression upon a change in a value of the terms.

6. The method of claim 1, wherein evaluating the input parameter expression or output parameter expression comprises running a sequence of the supervisory system.

7. The method of claim 6, wherein the sequence comprises a hierarchical plurality of sequences or procedures.

8. The method of claim 7, comprising driving or coordinating the hierarchical plurality of sequences or procedures with a sequence engine.

9. The method of claim 1, wherein the level of the supervisory system includes recipe procedures, recipe unit procedures, recipe operations, or recipe phases and the level of the equipment control system includes equipment procedures, equipment unit procedures, equipment operations, equipment phases, equipment modules, or control modules.

10. The method of claim 1, comprising using the value of the input parameter expression with the equipment control system to perform tasks associated with the batch process.

11. The method of claim 1, comprising using a value of the output parameter expression to record process, equipment, or material values for tasks performed by the equipment control system.

12. An automation system for a batch process, comprising:
a personal computer, comprising a batch management system comprising a hierarchical sequence of one or more steps, wherein the sequence comprises an input parameter expression and an output parameter expression, wherein the input parameter expression is based at least in part on a subscription to a data reference residing at or above the step of the batch management system where the input parameter expression resides, wherein the input parameter expression is configured to update continuously, and wherein the output parameter expression is configured to update based on a trigger;
a programmable logic controller, comprising an equipment control system comprising a hierarchy of one or more levels; and
a data transfer link between the one or more steps of the batch management system and the one or more levels of the equipment control system.

13. The system of claim 12, wherein the input parameter expression and output parameter expression each comprise an arithmetic expression that includes terms that are references to process data associated with the batch process, references to variables associated with materials used by the batch process, references to variables of the batch management system, references to variables of the equipment control system, or combinations thereof.

14. The system of claim 12, wherein the one or more steps of the batch management system includes recipe procedures, recipe unit procedures, recipe operations, or recipe phases and the one or more levels of the equipment control system includes equipment procedures, equipment unit procedures, equipment operations, equipment phases, equipment modules, or control modules.

15. The system of claim 12, wherein the input parameter expression or output parameter expression is evaluated by running the sequence.

16. The system of claim 12, wherein the equipment control system uses the data transfer link to receive a value of the input parameter expression from the batch management system or transfer data to the batch management system.

17. A non-transitory computer readable storage medium, comprising:
computer code disposed on the computer readable storage medium, wherein the code comprises instructions for automating a batch process, the instructions comprising:
instructions for performing a hierarchical sequence of one or more steps, wherein the sequence comprises an input parameter expression and an output parameter expression, wherein the input parameter expression is based at least in part on a subscription to a data reference residing at or above the step of the hierarchical sequence where the input parameter expression resides, wherein the input parameter expression is configured to update continuously, and wherein the output parameter expression is configured to update based on a trigger;
instructions for performing one or more levels of an equipment control system; and
instructions for transferring data between the one or more steps of the hierarchical sequence and the one or more levels of the equipment control system.

18. The computer readable medium of claim 17, wherein the input parameter expression and output parameter expression each comprise an arithmetic expression that includes terms that are references to process data associated with the batch process, references to variables associated with materials used by the batch process, references to variables of the equipment control system, or combinations thereof.

19. The computer readable medium of claim 17, comprising instructions for the one or more levels of the equipment control system to perform tasks associated
with the batch process using a value of the input parameter expression.

* * * * *